(12) United States Patent
Shibata et al.

(10) Patent No.: US 9,195,887 B2
(45) Date of Patent: Nov. 24, 2015

(54) RETRIEVING APPARATUS, RETRIEVING METHOD, AND COMPUTER PROGRAM PRODUCT

(71) Applicant: KABUSHIKI KAISHA TOSHIBA, Minato-ku, Tokyo (JP)

(72) Inventors: Tomoyuki Shibata, Kawasaki (JP); Yojiro Tonouchi, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 143 days.

(21) Appl. No.: 14/198,369

(22) Filed: Mar. 5, 2014

(65) Prior Publication Data
US 2014/0355885 A1 Dec. 4, 2014

(30) Foreign Application Priority Data
May 31, 2013 (JP) .................... 2013-116419

(51) Int. Cl.
G06K 9/00 (2006.01)
G06K 9/18 (2006.01)
(52) U.S. Cl.
CPC ................... *G06K 9/00402* (2013.01)
(58) Field of Classification Search
None
See application file for complete search history.

(56) References Cited

U.S. PATENT DOCUMENTS

| 4,286,255 | A | * | 8/1981 | Siy ..................... G07C 9/0015 382/123 |
| 4,375,081 | A | * | 2/1983 | Blesser ................. G06K 9/222 382/186 |
| 4,703,511 | A | * | 10/1987 | Conoval ............ G06K 9/00154 347/171 |
| 5,272,470 | A | * | 12/1993 | Zetts ................... G06F 3/04883 178/19.01 |
| 5,343,537 | A | * | 8/1994 | Bellegarda ........... G06K 9/6217 382/186 |
| 5,392,363 | A | * | 2/1995 | Fujisaki ............. G06K 9/00879 382/187 |
| 5,425,109 | A | * | 6/1995 | Saga ................... G06F 3/04845 345/441 |
| 5,454,046 | A | * | 9/1995 | Carman, II ............... G06K 9/68 382/186 |
| 5,515,455 | A | * | 5/1996 | Govindaraju ...... G06K 9/00865 382/101 |
| 5,781,661 | A | * | 7/1998 | Hiraiwa ............. G06K 9/00154 382/107 |
| 5,802,204 | A | * | 9/1998 | Basehore ............. G06K 9/6202 382/186 |

(Continued)

OTHER PUBLICATIONS

Cheng et al., "A Discriminative Model for On-line Handwritten Japanese Text Retrieval", International Conference on Document Analysis and Recognition, 2011, 4 pgs.

(Continued)

*Primary Examiner* — Randolph I Chu
(74) *Attorney, Agent, or Firm* — Knobbe, Martens, Olson & Bear LLP

(57) ABSTRACT

According to an embodiment, an apparatus includes an acquirer, a divider, an extractor, a calculator, and a retriever. The acquirer is configured to acquire a plurality of first point sequences. The divider is configured to divide each of the plurality of first point sequences into a plurality of second point sequences. The extractor is configured to extract a feature vector of each of the plurality of second point sequences. The calculator is configured to calculate a distance between the plurality of first point sequences based on an optimal path among the plurality of second point sequences that belong to each of the plurality of first point sequences. The retriever is configured to retrieve data corresponding to the plurality of first point sequences using the distance.

9 Claims, 9 Drawing Sheets

(56) References Cited

U.S. PATENT DOCUMENTS

| | | | | |
|---|---|---|---|---|
| 5,805,725 | A * | 9/1998 | Sakata | G06F 3/0488 345/619 |
| 6,052,481 | A * | 4/2000 | Grajski | G06K 9/68 382/187 |
| 6,339,655 | B1 * | 1/2002 | Aharonson | G06K 9/6211 382/186 |
| 7,218,782 | B1 * | 5/2007 | Reihani | G06K 9/00402 382/177 |
| 7,664,325 | B2 * | 2/2010 | Lin | G06K 9/0416 382/179 |
| 2002/0097910 | A1 * | 7/2002 | Guha | G06K 9/222 382/187 |
| 2002/0128796 | A1 * | 9/2002 | Matsutani | G06K 9/00154 702/155 |
| 2003/0122802 | A1 * | 7/2003 | Bryborn | G06K 9/222 345/173 |
| 2003/0215140 | A1 * | 11/2003 | Gounares | G06F 3/0481 382/187 |
| 2004/0165777 | A1 * | 8/2004 | Lossev | G06K 9/222 382/187 |
| 2005/0100217 | A1 * | 5/2005 | Abdulkader | G06K 9/6835 382/186 |
| 2005/0147281 | A1 * | 7/2005 | Wang | G06F 3/0317 382/119 |
| 2005/0147300 | A1 * | 7/2005 | Dresevic | G06F 17/241 382/186 |
| 2006/0050962 | A1 * | 3/2006 | Geiger | G06K 9/222 382/186 |
| 2007/0025618 | A1 * | 2/2007 | Lin | G06K 9/00416 382/186 |
| 2009/0136136 | A1 * | 5/2009 | Mori | G06K 9/222 382/187 |
| 2010/0052851 | A1 * | 3/2010 | Kaehler | G06F 3/017 340/5.81 |
| 2010/0128985 | A1 * | 5/2010 | El-Sana | G06K 9/00402 382/189 |
| 2011/0134068 | A1 * | 6/2011 | Shimoni | G06F 3/04883 345/173 |
| 2012/0069027 | A1 * | 3/2012 | Yamazaki | G06F 3/018 345/472.3 |
| 2012/0176324 | A1 * | 7/2012 | Akiyama | G06F 3/0488 345/173 |
| 2013/0315483 | A1 * | 11/2013 | Shibata | G06K 9/00865 382/179 |
| 2013/0315484 | A1 * | 11/2013 | Shibata | G06K 9/00469 382/179 |
| 2014/0035844 | A1 * | 2/2014 | Zhang | G06F 3/04883 345/173 |
| 2014/0055428 | A1 * | 2/2014 | Zou | G06F 3/04883 345/179 |
| 2014/0086489 | A1 * | 3/2014 | Motoi | G06K 9/18 382/187 |
| 2014/0104201 | A1 * | 4/2014 | Tsutsui | G06T 11/203 345/173 |
| 2014/0219564 | A1 * | 8/2014 | Demiya | G06F 3/04883 382/189 |
| 2014/0270529 | A1 * | 9/2014 | Sugiura | G06K 3/00402 382/189 |
| 2014/0321749 | A1 * | 10/2014 | Tsutsui | G06K 9/00463 382/186 |
| 2015/0154443 | A1 * | 6/2015 | Ookawara | G06F 17/2247 715/234 |

OTHER PUBLICATIONS

Luangvilay et al., "An On-line Handwritten Text Search Method based on Directional Feature Matching", International Conference on Document Analysis and Recognition, 2011, 4 pgs.

* cited by examiner

FIG.8

RETRIEVING APPARATUS, RETRIEVING METHOD, AND COMPUTER PROGRAM PRODUCT

CROSS-REFERENCE TO RELATED APPLICATION

This application is based upon and claims the benefit of priority from Japanese Patent Application No. 2013-116419, filed on May 31, 2013; the entire contents of which are incorporated herein by reference.

FIELD

Embodiments described herein relate generally to a retrieving apparatus, method, and computer program product.

BACKGROUND

A technique for retrieving data that matches or is similar to a query constituted of point sequences from a database is known.

BRIEF DESCRIPTION OF THE DRAWINGS

FIG. 8 is a diagram illustrating a display example of the embodiment;

DETAILED DESCRIPTION

According to an embodiment, an apparatus includes an acquirer, a divider, an extractor, a calculator, and a retriever. The acquirer is configured to acquire a plurality of first point sequences. The divider is configured to divide each of the plurality of first point sequences into a plurality of second point sequences. The extractor is configured to extract a feature vector of each of the plurality of second point sequences. The calculator is configured to calculate a distance between the plurality of first point sequences based on an optimal path among the plurality of second point sequences that belong to each of the plurality of first point sequences. The retriever is configured to retrieve data corresponding to the plurality of first point sequences using the distance.

A description will be given of an embodiment in detail below by referring to the accompanying drawings.

In an embodiment, a description will be given of the case where a handwritten character string handwritten by a user is used as a query to retrieve from a preliminarily written (for example, a large amount of) handwritten document. Here, in the embodiment, mainly, a description will be given of a character string as an example. However, the query may be free handwriting to which no character code such as a line or a mark drawn by the user is assigned. Any method may be used as a method for specifying a handwritten character string by the user. For example, the user may actually handwrite a character string to specify the query. The user may select a part to be used as the query from an existing handwritten document. The user may select a part to be used as the query from a template for query. A combination of these methods may be used.

Figure 1:
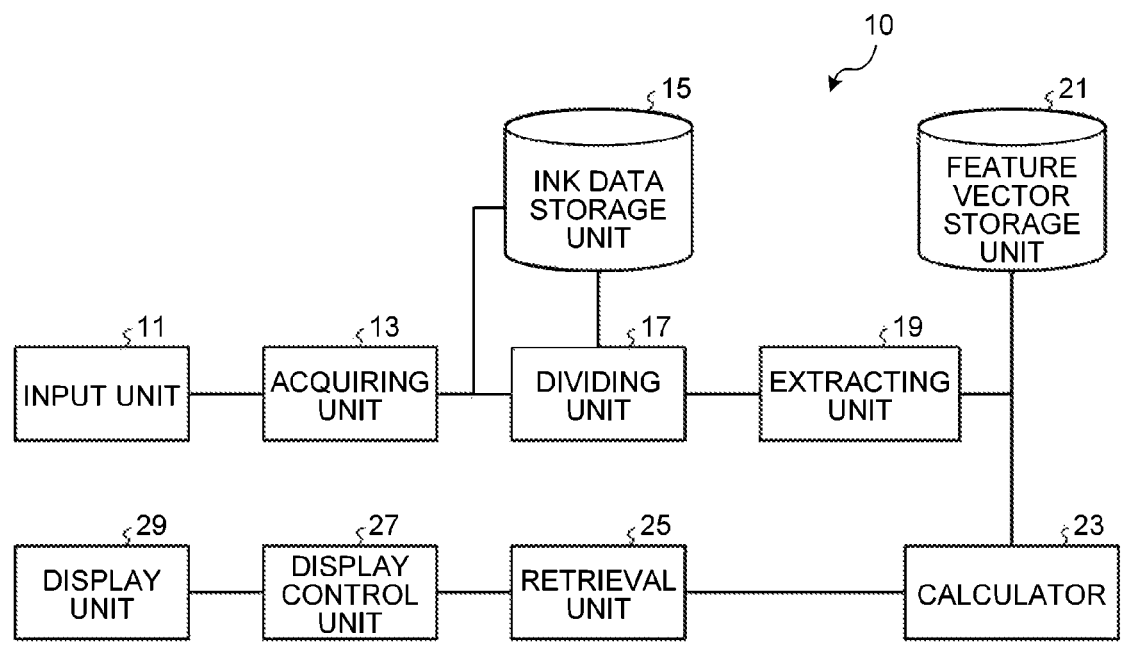
FIG. 1 is a configuration diagram illustrating an exemplary retrieving apparatus of an embodiment.

FIG. 1 is a configuration diagram illustrating an exemplary retrieving apparatus 10 of the embodiment. As illustrated in FIG. 1, the retrieving apparatus 10 includes an input unit 11, an acquiring unit 13, an ink data storage unit 15, a dividing unit 17, an extracting unit 19, a feature vector storage unit 21, a calculator 23, a retrieval unit 25, a display control unit 27, and a display unit 29.

The input unit 11 can be realized by, for example, an input device that allows handwriting input, such as a touchscreen, a touchpad, an electronic pen, or a computer mouse. The acquiring unit 13, the dividing unit 17, the extracting unit. 19, the calculator 23, the retrieval unit 25, and the display control unit 27 may be realized by, for example, execution of a program by a processing unit such as a central processing unit (CPU), that is, by software, or may be realized by hardware such as an integrated circuit (IC). Alternatively, these units may be realized by a combination of the software and the hardware. The ink data storage unit 15 and the feature vector storage unit 21 can be realized by, for example, a storage device that allows magnetic, optical, or electrical storage, such as a hard disk drive (HDD), a solid state drive (SSD), a memory card, an optical disk, or a random access memory (RAM). The display unit 29 may be realized by, for example, a display device such as a touchscreen display and a liquid crystal display.

The input unit 11 inputs a plurality of first point sequences to the retrieving apparatus 10. In the embodiment, the input unit 11 inputs a plurality of strokes (one example of the plurality of first point sequences), which is handwritten (drawn) or specified by the user with an intention for a character and similar matter, to the retrieving apparatus 10. This, however, should not be construed in a limiting sense. In the embodiment, the input unit 11 is a touchscreen. Assume that the user uses a stylus pen or a finger for handwriting on the touchscreen so as to input a plurality of strokes. This, however, should not be construed in a limiting sense. The input unit 11 may be realized by, for example, a touchpad, an electronic pen, or a computer mouse.

The stroke means one stroke of handwriting by the user, that is, the trajectory from the time the stylus pen or the finger is brought into contact with the input surface of the touchscreen until the stylus pen or the finger is lifted off the input surface (from a pen-down state until a pen-up state). The data expressing the stroke includes, for example, sampling points (time-series coordinate values) on the trajectory of the stylus pen or the finger with respect to the input surface of the touchscreen, a circumscribed rectangle of the trajectory, and a pen pressure of the trajectory.

Specifically, when the stylus pen or the finger becomes a pen-down state with respect to the input surface of the touchscreen, the touchscreen periodically samples a point on the trajectory of the stylus pen or the finger with respect to the input surface, a pen pressure of the trajectory, and an elapsed time from the time the input of the trajectory started. When the stylus pen or the finger becomes the pen-up state, the touchscreen extracts a circumscribed rectangle of the trajectory so as to generate data that expresses the stroke and to input the data to the retrieving apparatus 10.

Figure 2:
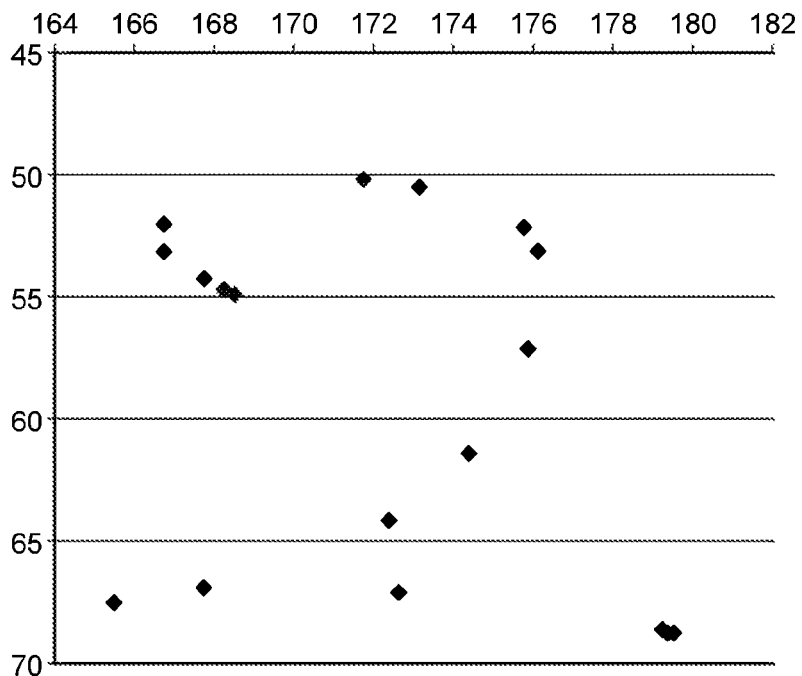
FIG. 2 is a diagram illustrating an example of a stroke in the embodiment.
Figure 3:
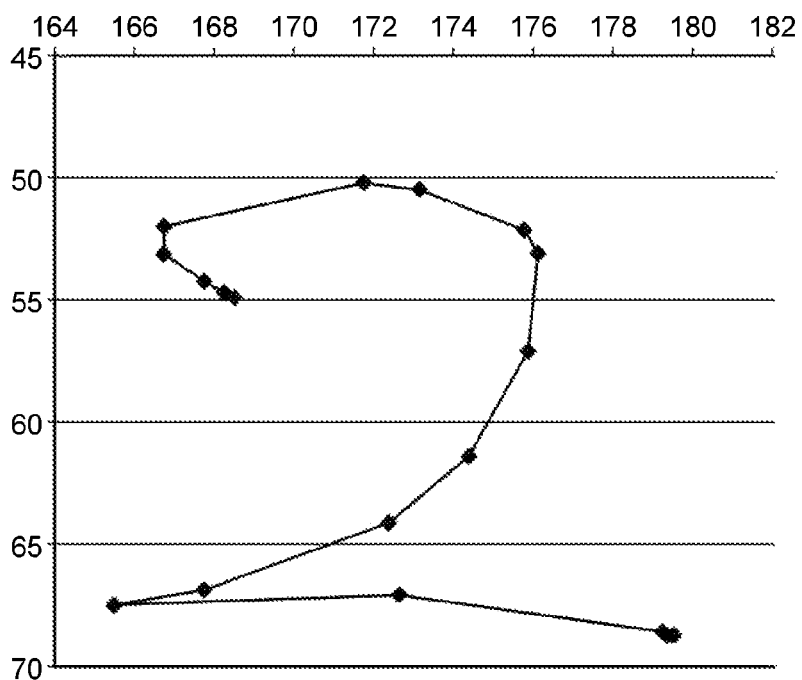
FIG. 3 is a diagram illustrating the example of the stroke in the embodiment.

FIG. 2 and FIG. 3 are diagrams illustrating an example of the stroke in the embodiment. In the example illustrated in FIG. 2, sampling points of the stroke are illustrated. In the example illustrated in FIG. 3, a stroke where the sampling points illustrated in FIG. 2 are subjected to linear interpolation in chronological order is illustrated. In the example illustrated in FIG. 2 and FIG. 3, the sampling was performed periodically (at a constant period). However, the coordinate distance between the sampling points is varied due to the writing speed by the user. Here, the number of the sampling points in the stroke is different for each stroke.

The acquiring unit 13 acquires a plurality of first point sequences. In the embodiment, the acquiring unit 13 sequentially acquires the stroke input from the input unit 11 so as to acquire a plurality of strokes. When the acquisition of the stroke is completed, that is, when the input of the stroke from the input unit 11 is completed, the acquiring unit 13 stores ink data, which is a group of data expressing the acquired stroke, in the ink data storage unit 15. Here, the completion of the input of the stroke from the input unit 11 includes a case where the user finishes writing a handwritten character string, a case where a save operation of a handwritten character string is performed, and similar case. That is, the ink data functions as data expressing a stroke group for each page (document).

In the case where the acquiring unit 13 stores a plurality of stroke groups in the ink data storage unit 15, the ink data can be associated with a page (document) ID so as to identify individual stroke groups. Alternatively, the acquiring unit 13 can associate the data expressing the stroke with a stroke ID so as to identify the individual strokes.

Figure 4:
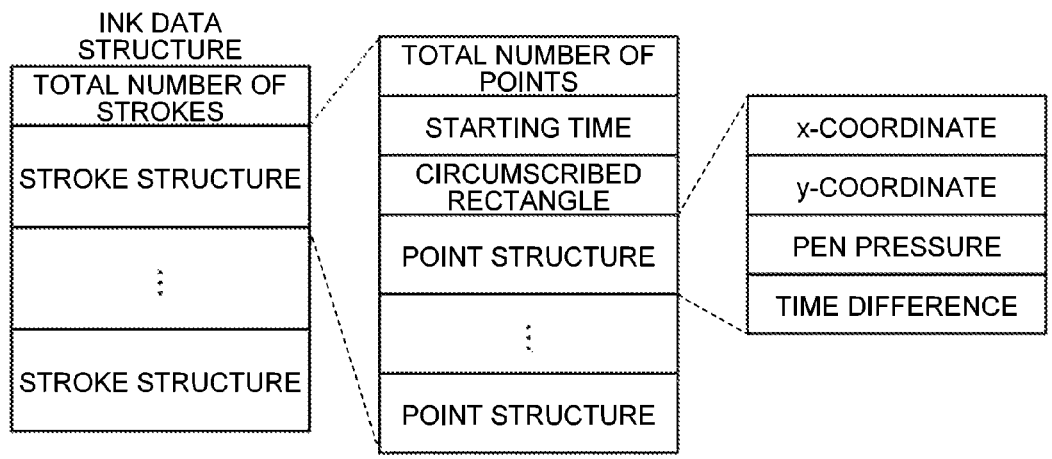
FIG. 4 is a diagram illustrating an example of a data structure of ink data in the embodiment.

FIG. 4 is a diagram illustrating an example of a data structure of the ink data in the embodiment, and illustrates a data structure of the ink data stored in the ink data storage unit 15 by the acquiring unit 13. In the embodiment, the ink data is expressed by a three-layer data structure including an ink data structure, a stroke structure, and a point structure. This, however, should not be construed in a limiting sense.

The ink data structure is a structure including the total number of strokes constituting the stroke group and stroke structures of the respective strokes constituting the stroke group. The stroke structure is a structure including the total number of sampling points constituting the stroke, a starting time at which the input of the stroke is started (a time at which the pen-down state is started), a circumscribed rectangle of the stroke, and a point structure of the respective sampling points constituting the stroke. In the embodiment, the circumscribed rectangle of the stroke has a rectangular shape with the minimum area containing the stroke. This, however, should not be construed in a limiting sense. The point structure is a structure that includes an x-coordinate, a y-coordinate, a pen pressure, and a time difference from the starting time of the sampling point. Here, the coordinate system including the x-coordinate and the y-coordinate can be a coordinate system where the origin is at an upper-left corner (angle) on the input surface of the touchscreen, a value of the x-coordinate becomes larger toward the right side of the touchscreen, and a value of the y-coordinate becomes larger toward the lower side of the touchscreen.

In the case where the touchscreen cannot sample the pen pressure, or in the case where the pen pressure is not used in the subsequent process, the pen pressure in the point structure may be omitted or a value indicating invalidity may be set to the pen pressure in the point structure. In the case where the touchscreen cannot sample the time such as the starting time and the time difference from the starting time, or in the case where the time is not used in the subsequent process, a value indicating the order of the point structure may be set to the time difference in the point structure, the time difference in the point structure may be omitted, or a value indicating invalidity may be set to the time difference in the point structure.

In each item of the stroke structure, actual data may be written. In order to separately manage the data of the ink data structure and the data of the stroke structure from each other, link information to a corresponding stroke structure may be written in a region of the stroke structure in the ink data structure. Similarly, in each item of the point structure, actual data may be written. In order to separately manage the data of the stroke structure and the data of the point structure from each other, link information to a corresponding point structure may be written in a region of the point structure in the stroke structure.

The dividing unit 17 divides each of the plurality of first point sequences acquired by the acquiring unit 13 into a plurality of second point sequences. In the embodiment, the dividing unit 17 divides each stroke constituting the stroke group (the plurality of strokes) indicated by the ink data stored in the ink data storage unit 15, into a plurality of sub-strokes. The dividing unit 17 adds data expressing the respective sub-strokes and link information indicating which data expressing the stroke this data belongs to, to the ink data stored in the ink data storage unit 15.

Figure 5:
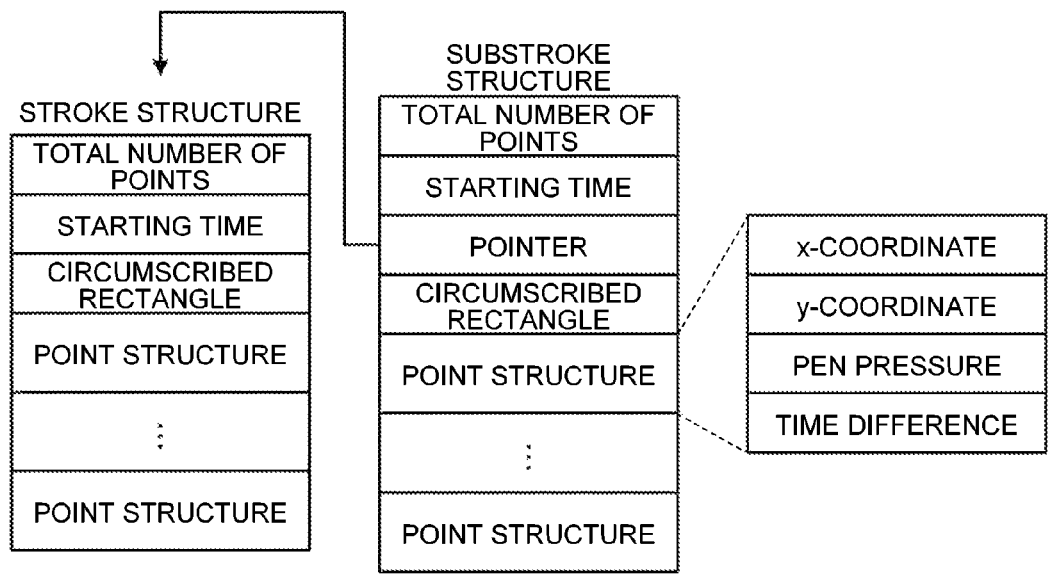
FIG. 5 is a diagram illustrating an example of a data structure of data expressing a sub-stroke in the embodiment.

FIG. 5 is a diagram illustrating an example of a data structure of data expressing the sub-stroke in the embodiment, and illustrates a data structure of the data added to the ink data storage unit 15 by the dividing unit 17. In the embodiment, the data expressing the sub-stroke is expressed by a two-layer data structure including a sub-stroke structure and a point structure. This, however, should not be construed in a limiting sense.

The sub-stroke structure is a structure including the total number of sampling points constituting the sub-stroke, a starting time at which the input of the sub-stroke is started, a pointer to the stroke structure of the stroke to which the sub-stroke belongs, a circumscribed rectangle of the sub-stroke, and a point structure of the respective sampling points constituting the sub-stroke.

The dividing unit 17 divides the stroke into a plurality of the sub-strokes such that, for example, respective curvatures of the plurality of sub-strokes become equal to or less than a threshold value. Here, the curvature of the stroke can be calculated at each sampling point. However, the number of sampling points varies depending on the size and the sampling rate of the stroke. Consequently, under this circumstance, points that allow calculation of the curvature vary for each stroke.

Therefore, the dividing unit 17 approximates the stroke by the fixed number of sampling points, and performs resampling so as to ensure a constant distance between the sampling points. The dividing unit 17 calculates coordinate values of the resampling point, for example, by linear interpolation so as to ensure a constant distance between the sampling points. In this case, as the dividing unit 17 decreases the numbers of resampling points, the stroke is approximated by straight lines.

For example, a curvature $C_S$ (base, i) from a resampling point $S_{base}$ to a resampling point $S_i$ in a stroke S as a division target is expressed by Equation (1).

$$C_s(\text{base}, i) = \text{dist}(S_{base}, S_i) \Big/ \sum_{j=base}^{i-1} \text{dist}(S_j, S_{j+1}) \quad (1)$$

Here, dist($S_j$, $S_{j+1}$) denotes a distance from the sampling point $S_j$ to the sampling point $S_{j+1}$. As the value of the curvature $C_S$(base, i) becomes closer to 1, the stroke S becomes a straight line. As the value of the curvature $C_S$(base, i) becomes closer to 0, the stroke S becomes a curved line.

The dividing unit 17 sequentially calculates a curvature from a starting point for each resampled stroke and divides the stroke until immediately before a sampling point having a curvature with equal to or less than a threshold value into sub-strokes. Then, the dividing unit 17 performs similar process until an ending point.

The method for dividing the stroke is not limited to this. The dividing unit 17 may divide the stroke into the plurality of sub-strokes such that, for example, respective lengths of the plurality of sub-strokes become equal to or less than a threshold value. Alternatively, the dividing unit 17 may divide the stroke into the plurality of sub-strokes such that the number of the plurality of sub-strokes becomes a predetermined number.

The embodiment has been described assuming that the dividing unit 17 divides the respective strokes after the acquiring unit 13 completes the acquisition of the stroke group. However, the acquisition of the stroke by the acquiring unit 13 and the division of the stroke by the dividing unit 17 may be processed in parallel.

The extracting unit 19 extracts respective feature vectors of the plurality of second point sequences divided by the dividing unit 17. In the embodiment, the extracting unit 19 extracts respective unique feature vectors of the plurality of sub-strokes from these sub-strokes.

Here, the dividing unit 17 resamples the stroke. Therefore, every stroke has the same number in the point structure. However, since the number of the point structures in the sub-stroke depends on the method for dividing the stroke, all the sub-strokes do not necessarily have the same number in the point structure.

Therefore, the extracting unit 19 approximates the sub-stroke by the fixed number of sampling points for resampling. The extracting unit 19 resamples, for example, the sub-stroke lengths at a constant interval with the fixed number N (for example, N=128) of sampling points and performs linear interpolation based on two points at the proximity of the sampling points of the original sub-stroke so as to calculate the coordinate values of the resampling point.

The extracting unit 19 calculates a unique feature vector to represent the sub-stroke using the following method. However, the method for extracting the feature vector is not limited to this.

First, the extracting unit 19 sets up a square sub-stroke region whose length on one side is that of a long side of a circumscribed rectangle of the sub-stroke regarding the resampled sub-stroke. At this time, the extracting unit 19 sets the sub-stroke region such that the center of the circumscribed rectangle of the sub-stroke is positioned at the center of the sub-stroke region. Here, the center of the sub-stroke region is, for example, an average position of coordinates of a plurality of points in the sub-stroke region.

Next, the extracting unit 19 uses Equation (2) to quantize an angle (a direction) of a vector between two sampling points of the resampled sub-stroke and calculate bins for a voting histogram. Here, the writing direction of the sub-stroke has a meaning. Therefore, the range of value of the angle is set from $-\pi$ to $\pi$.

$$\text{bin} = \left\{ \frac{1}{2}(a\tan 2(devy, devx)/\pi + 1) \times \text{direction} \right\} \% \text{ direction} \quad (2)$$

Here, devx and devy denote vector components between two sampling points corresponding to a differential value of the sub-stroke, and "direction" denotes the number of quantization in the direction.

A direction histogram is calculated not from the entire sub-stroke region, but from each block region obtained by dividing the sub-stroke region into blocks, and the respective direction histograms are combined together. This improves expression of the feature vector. Accordingly, in the embodiment, the extracting unit 19 divides the sub-stroke region into blocks. Since the sub-stroke may be a straight line that does not have a fixed aspect ratio and is parallel to the x-axis or the y-axis, the blocks are divided so as to preserve the aspect ratio as indicated in Equation (3) and Equation (4).

$$xbin_i = \left\{ \frac{(x_i - x_{min})}{length_x} \times \text{split} \right\} \% \text{ split} \quad (3)$$

$$ybin_i = \left\{ \frac{(y_i - y_{min})}{length_y} \times \text{split} \right\} \% \text{ split} \quad (4)$$

Here, $x_i$ and $y_i$ denote respective coordinate values of the i-th resampling point, $x_{min}$ and $y_{min}$ denote respective smallest coordinate values in the sub-stroke, $length_x$ and $length_y$ denote respective sizes of the ranges of value in the coordinate, and split denotes a division number.

That is, the extracting unit 19 calculates to which block region each sampling point belongs, and calculates bins for the voting histogram using Equation (2) in each block region.

For example, in the block region, assume that a quantization value in the x-axis direction is x, a quantization value in the y-axis direction is y, a quantization value of a directional component is d, and a bin of a voting destination is bin(x, y, d). The extracting unit 19 perform votes such as bin(x, y, d)=9, bin(x, y, d')=6, bin(x', y, d)=4, bin(x', y, d')=3, bin(x, y', d)=4, bin(x, y', d')=3, bin(x', y', d)=3, and bin(x', y', d')=2.

Here, x', y', and d' denote respective nearest quantization values.

Here, when the feature is extracted from the sub-stroke, the direction is quantized. The quantization destination may be changed due to even slight blurring of writing. Therefore, a bin in an adjacency relationship with the target bin is voted with a weight. This allows robust feature extraction against writing jitter. For example, in the case of quantization in eight directions, the extracting unit 19 preliminarily performs quantization in 16 directions and then performs smoothing in eight directions with a Gaussian filter as indicated in Equation (5).

$$d_i = (2d'_{2i-1} + 3d'_{2i} + 2d'_{2i+1})/7 \quad (5)$$

Here, $d_i$ denotes a frequency in an "i" direction to be calculated, and $d_i'$ denotes a frequency quantized at double resolution. In the case of i=0, since the direction has periodicity, smoothing is performed using a Gaussian filter as indicated in Equation (6). In this case, the number of the preliminary quantization may be "2 direction".

$$d_i' = (2d'_{2direction-1} + 3d'_0 + 2d'_1)/7 \quad (6)$$

The smoothing is performed on not only the direction, but also between the block regions, so as to perform robust feature extraction against writing jitter. In this case, unlike the direction, there is no periodicity between block regions. Therefore, the extracting unit 19 divides the sub-stroke region into (2 split+1)×(2 split+1), and then smoothes each of split× split regions with a Gaussian filter as indicated in Equation (7).

$$coored(x, y) = \frac{1}{|W|} \sum_{k=1}^{3} \sum_{j=1}^{3} coored'(2x - 2 + j, 2y - 2 + k)w_{j,k} \quad (7)$$

Here, coord(x, y) denotes a histogram of an extraction target region, coord'(x, y) denotes a histogram in which the region is divided into the preliminarily calculated (2 split+1)×(2 split+1), and |W| denotes the Gaussian filter.

As described above, the extracting unit 19 finally extracts a feature vector in a dimension of split×split× deliction. The extracting unit 19 stores respective feature vectors of the extracted plurality of sub-strokes and association information in the feature vector storage unit 21. The association information associates the feature vector of the sub-stroke with the stroke to which this sub-stroke belongs.

For example, in the case where the acquiring unit 13 assigns a stroke ID to the stroke, this stroke ID can be used as the association information. For example, the link information to the stroke structure of the stroke to which the sub-stroke belongs can be used as the association information. The ink data storage unit 15 and the feature vector storage unit 21 may be integrated as one database, and the feature vectors may be written within the sub-stroke structure, The embodiment has been described assuming that the extracting unit 19 extracts the respective feature vectors of the sub-strokes after the dividing unit 17 completes division of the stroke group. However, the acquisition of the stroke by the acquiring unit 13, the division of the stroke by the dividing unit 17, and the extraction of the feature vector of the sub-stroke by the extracting unit 19 may be processed in parallel.

The calculator 23 calculates a distance between a plurality of the first point sequences based on an optimal path among a plurality of second point sequences that belongs to each of the plurality of first point sequences. In the embodiment, the calculator 23 calculates a distance between the strokes constituting the stroke group based on an optimal path among a plurality of respective sub-strokes that belongs to each of the stroke groups (a plurality of strokes).

Specifically, the calculator 23 obtains a distance between the strokes by performing dynamic programming (DP) matching (elastic matching in a broad sense) using a distance based on respective feature vectors of a plurality of sub-strokes that belong to these stroke so as to obtain an optimal combination (an optimal path), and by obtaining an average distance of this optimal combination.

That is, the calculator 23 calculates a distance between the strokes using feature vectors (feature vectors) of the sub-strokes extracted by the extracting unit 19. In the embodiment, a distance between the strokes is calculated by performing matching per unit of sub-stroke using DP matching. The distance between the sub-strokes is specified by a distance between the respective feature vectors of the sub-strokes. Therefore, it is only necessary to use an optimal Metric corresponding to the feature vector. For example, the distance between the sub-strokes may be L2 norm or L1 norm, or may be a value obtained by subtracting a calculated likelihood between the vectors using, for example, normalized cross-correlation (to be unified by distance criterion) from a value of 1.

Here, if DP matching is performed on all the sub-strokes, the calculation amount increases. For example, assuming that the average division ratio of the stroke is R regarding a stroke group (with a stroke count of N) of a retrieval target and a stroke group (with a stroke count of M) to be a query, the number of sub-strokes becomes R times higher in each stroke. Accordingly, the search range is increased from N×M to NR×MR. Here, the stroke group to be the query is a stroke group handwritten or specified by the user and corresponds to a stroke group acquired by the acquiring unit 13.

Accordingly, in the embodiment, the calculator 23 performs DP matching in two stages so as to reduce increase of the search range in association with divisions of the stroke. Specifically, the calculator 23 first performs a first-stage DP matching between the strokes, and then performs a second-stage DP matching between sub-stroke sequences that belong to each stroke matched by the DP matching in the first stage.

As a result, in the first-stage DP matching, the search is performed according to stroke count for the strokes. This reduces the search range to N×M (see FIG. 6).

For example, assume that a sub-stroke sequence formed by dividing a stroke $x_p$ with "I" strokes is $x_p'$, a sub-stroke sequence formed by dividing a stroke $y_p$ with "J" strokes is $y_p'$, a stroke count of the sub-stroke sequence $x_p'$ is $I_p'$ strokes, and a stroke count of the sub-stroke sequence $y_p'$ is $J_p'$ strokes. In this case, a distance $d(x_p, y_p)$ between the stroke $x_p$ and the stroke $y_p$ is calculated as a distance $d(x_p', y_p')$ between the sub-stroke sequence $x_p'$ and the sub-stroke sequence $y_p'$. Here, the distance $d(x_p', y_p')$ between the sub-stroke sequences is calculated as a total cost $g'(I_p', J_p')$ of a path of the DP matching (the second-stage DP matching) per unit sub-stroke. That is, $d(x_p, y_p) = d(x_p', y_p') = g'(I_p', J_p')$ is satisfied.

Figure 6:
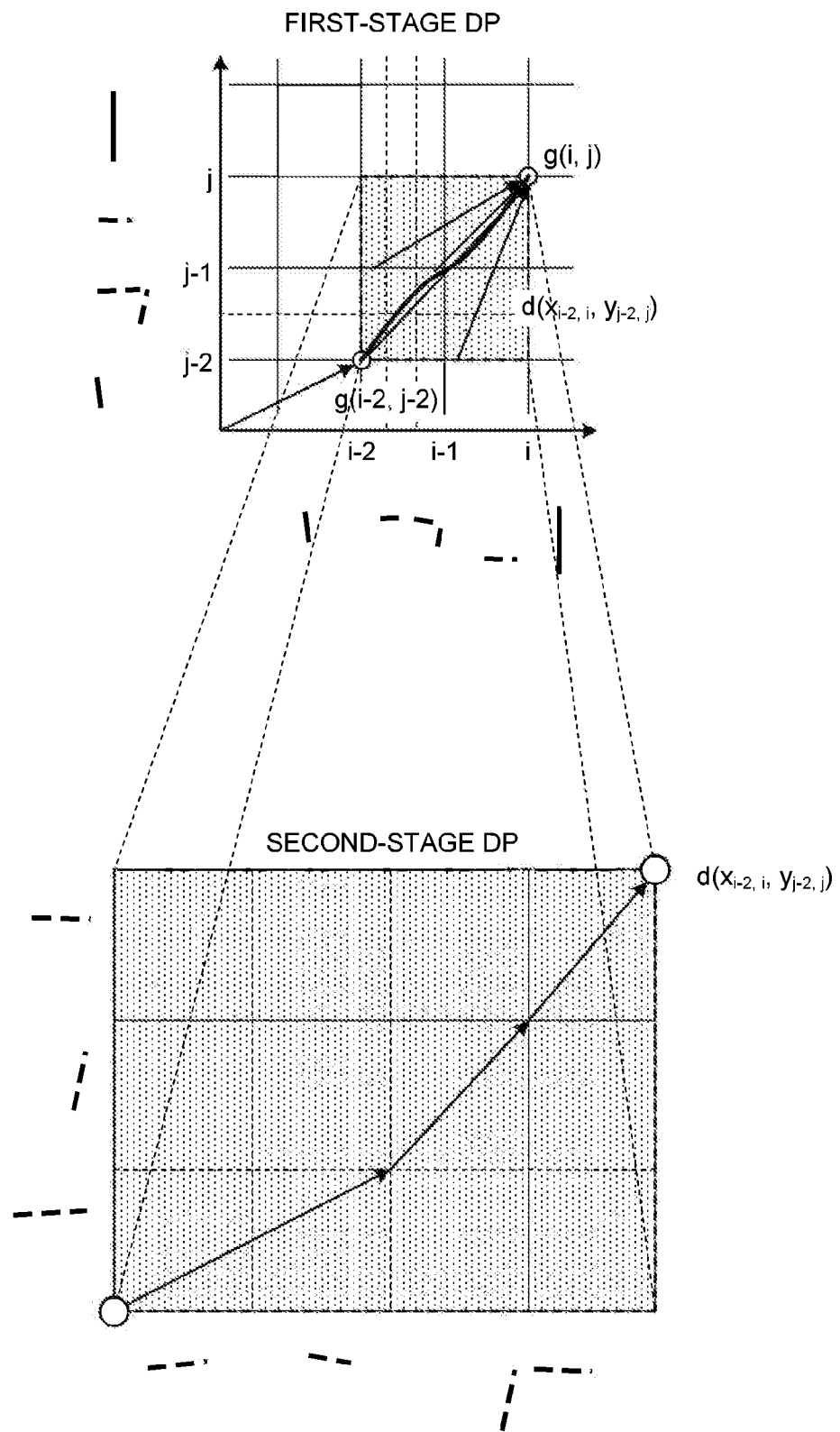
FIG. 6 is a diagram illustrating an example of DP matching in the embodiment.

Here, $g'(I_p', J_p')$ can be calculated using recurrence Equations of Equation (8) to Equation (11) (see FIG. 6).

$$g'(i', j') \min_{\substack{1 \le k \le N \\ 1 \le l \le N}} \{g'(i' - k, j' - 1) + 1 \cdot d(x'_{i'-k,1'}, y'_{j'-1,j'})\} \quad (8)$$

$$(i' = 1, \ldots I_p', j' =, \ldots I_p')$$

$$g(0, 0) = 0 \quad (9)$$

$$g(i', 0) = \infty (i' = 1, \ldots, I_p') \quad (10)$$

$$g(0, j') = \infty (j' = 1, \ldots, J_p') \quad (11)$$

Here, g'(i', j') is an accumulated cost of the optimal path up to (i', j') and $d(x'_{i'-k, i'}, y'_{j'-1, j'})$ is a cost (a local distance) when a sub-stroke sequence $x'_{i'-k}, \ldots, x'_{i'}$ from the (i'-k)-th element to the i'-th element of x' matches a sub-stroke sequence $y'_{j'-1}, \ldots, y'_{j'}$ from the (j'-k)-th element to the j'-th element of y'.

The retrieval unit 25 retrieves data corresponding to a plurality of first point sequences using a distance calculated by the calculator 23. In the embodiment, the retrieval unit 25 retrieves character string data corresponding to the stroke group acquired by the acquiring unit 13 using the distance calculated by the calculator 23. That is, the retrieval unit 25 uses the stroke group acquired by the acquiring unit 13 as a query, and retrieves character string data using the distance, which are calculated by the calculator 23, between the strokes constituting the stroke group. Specifically, the retrieval unit 25 obtains optimal correspondence among the respective sub-strokes by DP matching between the sub-strokes, and performs DP matching using an average of distances of feature vectors between the respective corresponding sub-strokes as the original distance among the strokes. That is, the DP matching as performed in two stages within the stroke and between the strokes.

A retrieval target of the retrieval unit 25, that is, the database storing the character string data may be disposed in the retrieving apparatus 10, or may be disposed outside (for example, on the intranet, the Internet, or a storage medium externally coupled to the retrieving apparatus 10). Additionally, it is preferred that the above-described feature vectors be associated with the character string data of the retrieval target.

Figure 7:
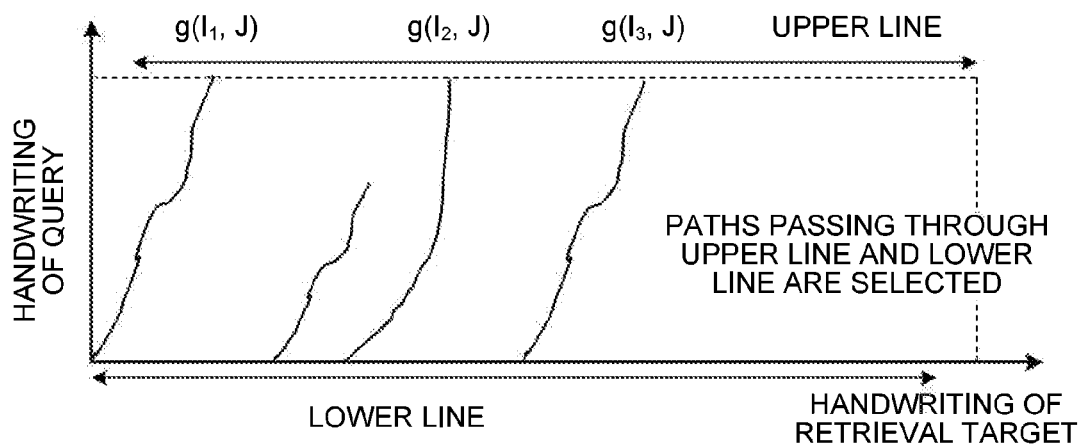
FIG. 7 is a diagram illustrating a retrieval example of the embodiment.

For example, the retrieval unit 25 performs stroke matching whereby the sum of the distance, which is calculated by the calculator 23, between two stroke sequences becomes minimum. Specifically, the retrieval unit 25 performs a path search process with DP matching using recurrence Equations of Equation (12) to Equation (14) (see FIG. 7).

$$g(i, j) = \min_{\substack{1 \leq k \leq N \\ 1 \leq l \leq N}} \{g(i-k, j-l) + 1 \cdot d(x_{i-k,1}, y_{k-1,j})\} \quad (12)$$

$$g(i, 0) = \infty (i = 0, \ldots, I) \quad (13)$$

$$g(0, j) = \infty (j = 1, \ldots, J) \quad (14)$$

Here, $g(i, j)$ is an accumulated cost of the optimal path up to $(i, j)$ and $d(x_{i-k, i}, y_{j-l, j})$ is a cost (a local distance) when a stroke sequence $x_p$ with "k" strokes from the (i–k)-th element to the i-th element of a stroke x matches a stroke sequence $y_p$ with "l" strokes from the (j–k)-th element to the j-th element of a stroke y.

Assume that a stroke group H is a retrieval target, a stroke group Y is a query, and respective stroke counts are I and J. The stroke sequence of the stroke group Y included in a path expressed by Equation (15) becomes the retrieval result of the retrieval unit 25 (see FIG. 7).

$$g(i,J)(1 \leq i \leq I) \leq \text{threshold value} \quad (15)$$

The display control unit 27 displays the data retrieved by the retrieval unit 25 on the display unit 29. In the embodiment, the display control unit 27 displays the character string data retrieved by the retrieval unit 25 on the display unit 29. For example, the display control unit 27 may divide a screen of the display unit 29 into a tiled pattern as illustrated in FIG. 8 to display scaled-down thumbnails of documents in respective tiles. At this time, the display control unit 27 may arrange the thumbnails of documents, for example, in order of higher similarity to the retrieval result of the stroke sequence included in the documents as a display order. Alternatively, the stroke sequence of the retrieval result may be highlighted in the thumbnail.

Figure 9:
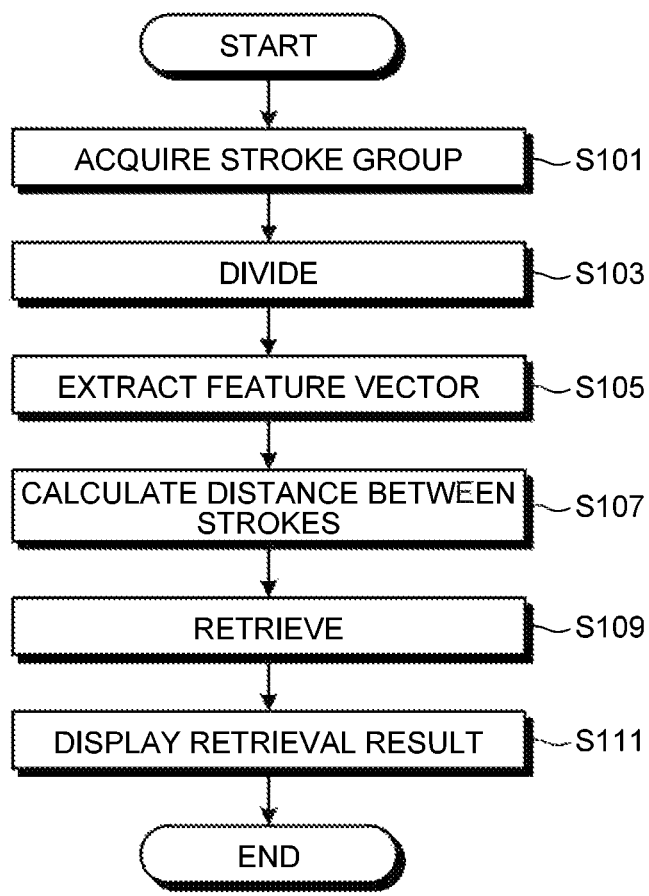
FIG. 9 is a flowchart diagram illustrating a process example of the embodiment.

FIG. 9 is a flowchart diagram illustrating an exemplary procedural flow of a process performed in the retrieving apparatus 10 of the embodiment.

First, the acquiring unit 13 sequentially acquires the stroke input by the input unit 11 so as to acquire a stroke group (in step S101).

Subsequently, the dividing unit 17 divides the respective strokes constituting the stroke group acquired by the acquiring unit 13 into a plurality of sub-strokes (in step S103).

Subsequently, the extracting unit 19 extracts a unique feature vector of each of the plurality of sub-strokes from these sub-strokes (in step S105).

Subsequently, the calculator 23 calculates a distance between the strokes constituting the stroke group based on an optimal path among a plurality of respective sub-strokes that belongs to the stroke group (in step S107).

Subsequently, the retrieval unit 25 uses the distance calculated by the calculator 23 to retrieve character string data corresponding to the stroke group acquired by the acquiring unit 13 (in step S109).

Subsequently, the display control unit 27 displays the character string data retrieved by the retrieval unit 25 on the display unit 29 (in step S111).

In the above-described process, steps S101 to S105 can also be performed in parallel.

As described above, according to the embodiment, the stroke constituting the stroke group is divided into a plurality of sub-strokes as a query for retrieval. This can artificially increase the number of strokes even in the case where the number of the strokes constituting the stroke group is small, thus suppressing reduction in the retrieval precision. During the retrieval, the retrieval was performed based on the optimal path between the sub-stroke sequences. This reduces processing cost during the retrieval, thus suppressing reduction in the retrieval speed.

Hardware Configuration

Figure 10:
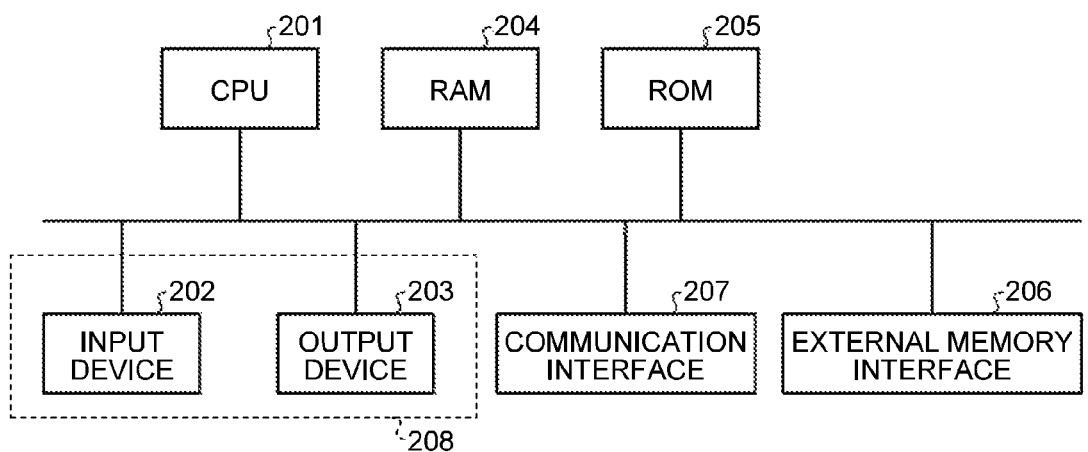
FIG. 10 is a diagram illustrating an exemplary hardware configuration of the retrieving apparatus of the embodiment.

FIG. 10 is a diagram illustrating an exemplary hardware configuration of the retrieving apparatus 10 of the embodiment. As illustrated in FIG. 10, the retrieving apparatus 10 includes a CPU 201, an input device 202, an output device 203, a RAM 204, a ROM 205, an external memory interface 206, and a communication interface 207. For example, in the case where a touchscreen is used as the input device 202 and the output device 203, a liquid crystal panel, a pen, a stroke detection device disposed on the liquid crystal panel, and similar device are used (see reference numeral 208).

The program executed in the retrieving apparatus 10 of the embodiment is preliminarily embedded in a ROM or a similar storage to provide. The program executed in the retrieving apparatus 10 of the embodiment may be provided as a file in an installable file format or an executable file format, which is stored on a storage medium from which computers are able to read the program, for example, a CD-ROM, a CD-R, a memory card, a DVD, and a flexible disk (FD). The program executed in the retrieving apparatus 10 of the embodiment may also be stored on a computer that is connected to a network such as the Internet so as to be provided by downloading through the network.

The program executed in the retrieving apparatus 10 of the embodiment has a module configuration to realize the respective units described above on a computer. As actual hardware, for example, the CPU 201 reads the program from the ROM 205 onto the RAM 204 and executes the program to realize the respective units described above on the computer.

The retrieving apparatus 10 in the embodiment may be configured as a stand-alone device or in a form distributed as a plurality of nodes that can communicate each other through a network. The retrieving apparatus of the embodiment may be realized by various devices such as a desktop or laptop general-purpose computer, a portable general-purpose computer, other portable information devices, an information device with a touchscreen, a smart phone, and other information devices.

Figure 11:
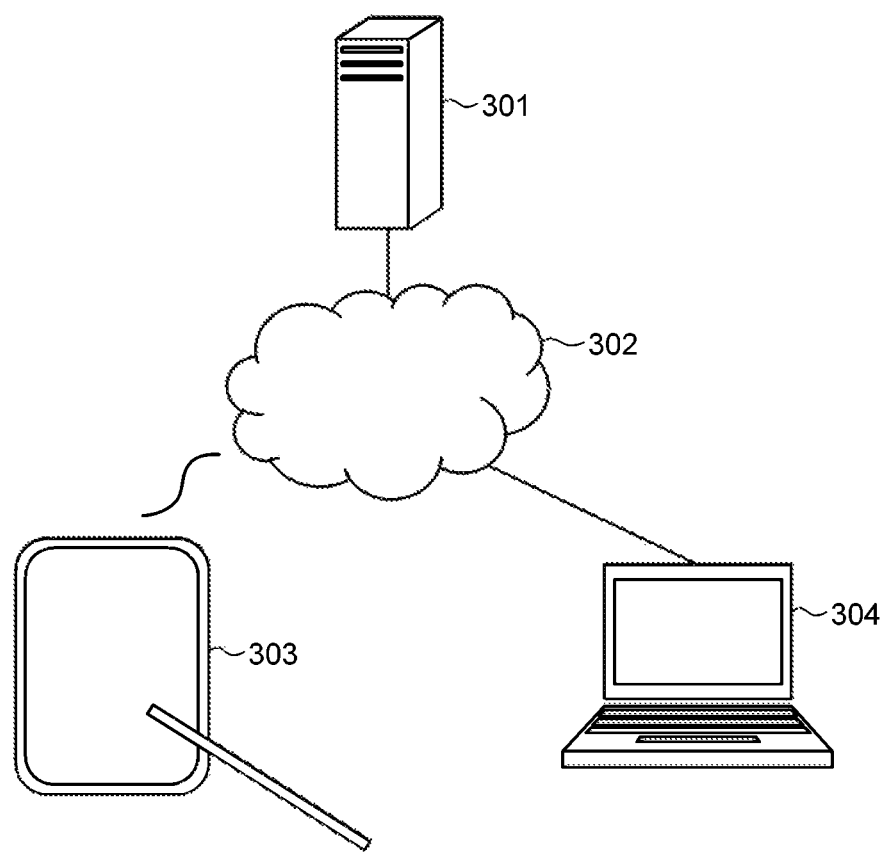
FIG. 11 is a diagram illustrating an example of the retrieving apparatus of the embodiment.

For example, FIG. 11 illustrates an example of a case where a server 301 is present on a network 302 such as the intranet and/or the Internet and respective clients 303 and 304 communicate the server 301 through the network 302 so as to realize the retrieving apparatus 10.

A case where the client 303 is connected to the network 302 through wireless communication while the client 304 is connected to the network 302 through wired communication is illustrated. The clients 303 and 304 are usually user devices. The server 301 may be, for example, disposed on a LAN such as an intra-company LAN, or may be run by Internet service provider or similar provider. Additionally, the server 301 may be a user device that allows a user to provide a function to another user.

When explained based on the configuration in FIG. 1, the input unit 11, the acquiring unit 13, the display control unit 27, and the display unit 29 may be provided on the client side while the other configurations are provided on the server side. Alternatively, the calculator 23 and the retrieval unit 25 may be provided on the server side while the other configurations are provided on the client side.

Here, an apparatus including a configuration other than the input unit 11, the acquiring unit 13, the display control unit 27, and the display unit 29 may be realized or an apparatus including the display control unit 27 and the display unit 29 may be realized. In this case, this apparatus has a function for extracting a feature vector from a sub-stroke.

For example, the input unit 11, the acquiring unit 13, the display control unit 27, and the display unit 29 may be included in the client side, the calculator 23 and the retrieval unit 25 may be included in a first server, and the ink data storage unit 15, the dividing unit 17, the extracting unit. 19, and the feature vector storage unit 21 may be included in a second server.

A distribution method other than these is also possible.

First Modification

In the retrieving apparatus 10, the stroke acquired by the acquiring unit 13 may be sound waveform data. In this case, the acquiring unit 13 performs analog/digital conversion on a sound input from an input device such as a microphone so as to acquire a digital signal. For example, the sound is sampled at 16 KHz and converted into a 16-bit quantized digital signal.

Subsequently, the acquiring unit 13 divides the sound signal into audio segments and silent segments by a threshold with respect to an amplitude value of the digital signal, and sequentially outputs an unbroken audio segment to the dividing unit 17. This dividing method is not limited to the above-described method. For example, the result of division by a certain time segment may be output without division into audio segments and silent segments. As the output, both the audio segment and the silent segment may be output to the dividing unit 17.

The dividing unit 17 divides one unbroken sound segment output from the acquiring unit 13 at a predetermined certain interval, and sequentially outputs the division result to a feature extracting unit. The division is not limited to division at a certain interval. For example, a process of division when a difference in spectrum of adjacent frames exceeds a certain level may be performed using spectral analysis and similar method.

The extracting unit 19 resamples one divided sound segment output from the dividing unit 17 such that the number of samples becomes a predetermined number, similarly to the embodiment. Subsequently, Fourier transformation and 24-dimensional Mel-filter bank analysis are applied to calculate a vector having an element of 24-dimensional log Mel spectrum as a feature vector.

The feature vector used here is not limited to the log Mel spectrum. For example, a sound feature vector such as Mel Frequency Cepstrum Coefficient (MFCC) is possible, Second Modification In the retrieving apparatus 10, the stroke acquired by the acquiring unit 13 may be trajectory data of location information. In this case, the acquiring unit 13 acquires location information from a position measuring device such as a Global Positioning System (GPS). The acquiring unit 13 preserves the acquired location information as a stroke of the trajectory. Similarly to the embodiment, the stroke as the location information is preserved as a group of coordinate values in two dimensional space. In this case, some criteria for combining the values as one stroke are possible. For example, segments having moving amount equal to or more than a threshold value within a certain period of time are only preserved as a stroke.

As described above, according to the above-described embodiment and the respective modifications, the reduction in the retrieval speed is suppressed while the retrieval precision is improved.

For example, the respective steps in the flowchart of the aforementioned embodiments may be executed in a modified execution order, executed at the same time, or executed in a different execution order for each execution insofar as the execution is compatible with the respective steps.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus, comprising:
   an acquirer configured to acquire a plurality of first point sequences;
   a divider configured to divide each of the plurality of first point sequences into a plurality of second point sequences;
   an extractor configured to extract a feature vector of each of the plurality of second point sequences;
   a calculator configured to calculate a distance between the plurality of first point sequences based on an optimal path among the plurality of second point sequences that belong to each of the plurality of first point sequences; and
   a retriever configured to retrieve data corresponding to the plurality of first point sequences using the distance.

2. The apparatus of claim 1, wherein
   the divider is configured to divide each of the plurality of first point sequences into the plurality of second point sequences so that a curvature of each of the plurality of second point sequences becomes equal to or less than a threshold value.

3. The apparatus of claim 1, wherein
   the divider is configured to divide each of the plurality of first point sequences into the plurality of second point sequences so that a length of each of the plurality of second point sequences becomes equal to or less than a threshold value.

4. The apparatus of claim 1, wherein
the divider is configured to divide each of the plurality of first point sequences into the plurality of second point sequences such that the number of plurality of second point sequences becomes a first number.

5. The apparatus of claim 1, further comprising a display controller configured to display the retrieved data on a display unit.

6. The apparatus of claim 5, wherein
the plurality of first point sequences constitute a stroke group of a character string handwritten by a user,
each of the plurality of second point sequences correspond to a sub-stroke of a stroke of the stroke group,
the data is character string data indicative of a character string,
the acquirer is configured to acquire the stroke group by sequentially acquiring strokes constituting the stroke group,
the divider is configured to divide each of the strokes constituting the stroke group into a plurality of sub-strokes,
the calculator is configured to calculate a distance between the strokes constituting the stroke group based on an optimal path among the sub-strokes that belong to each of the strokes constituting the stroke group,
the retriever is configured to retrieve the character string data corresponding to the stroke group using the distance, and
the display controller is configured to display the retrieved character string data on the display unit.

7. The apparatus of claim 1, wherein
the acquirer is configured to acquire the plurality of first point sequences specified by a user.

8. A method, comprising:
acquiring a plurality of first point sequences;
dividing each of the plurality of first point sequences into a plurality of second point sequences;
extracting a feature vector of each of the plurality of second point sequences;
calculating a distance between the plurality of first point sequences based on an optimal path among the plurality of second point sequences that belong to each of the plurality of first point sequences; and
retrieving data corresponding to the plurality of first point sequences using the distance.

9. A computer program product comprising a non-transitory, computer-readable medium containing a program executable by a computer, the program when executed causing the computer to:
acquire a plurality of first point sequences;
divide each of the plurality of first point sequences into a plurality of second point sequences;
extract a feature vector of each of the plurality of second point sequences;
calculate a distance between the plurality of first point sequences based on an optimal path among the plurality of second point sequences that belong to each of the plurality of first point sequences; and
retrieve data corresponding to the plurality of first point sequences using the distance.

* * * * *